US009067826B2

(12) United States Patent
Bullerjahn et al.

(10) Patent No.: US 9,067,826 B2
(45) Date of Patent: *Jun. 30, 2015

(54) TERNESITE USED AS AN ADDITIVE IN PORTLAND CEMENT

(75) Inventors: Frank Bullerjahn, Leimen (DE); Dirk Schmitt, Leimen (DE); Mohsen Ben Haha, Heidelberg (DE); Barbara Batog, Jablonka (PL); Linda Irbe, Heppenheim (DE)

(73) Assignee: HEIDELBERGCEMENT AG, Heidelberg (DE)

( * ) Notice: Subject to any disclaimer, the term of this patent is extended or adjusted under 35 U.S.C. 154(b) by 0 days.

This patent is subject to a terminal disclaimer.

(21) Appl. No.: 14/239,319

(22) PCT Filed: Jul. 16, 2012

(86) PCT No.: PCT/EP2012/002974
§ 371 (c)(1),
(2), (4) Date: Apr. 29, 2014

(87) PCT Pub. No.: WO2013/023727
PCT Pub. Date: Feb. 21, 2013

(65) Prior Publication Data
US 2014/0230696 A1    Aug. 21, 2014

(30) Foreign Application Priority Data

Aug. 18, 2011  (EP) .................................... 11006757
Oct. 26, 2011  (EP) .................................... 11008570
Mar. 5, 2012   (EP) .................................... 12001488
Mar. 26, 2012  (EP) .................................... 12002111
Mar. 30, 2012  (EP) .................................... 12002342
May 10, 2012   (EP) .................................... 12003718

(51) Int. Cl.
*C04B 7/345* (2006.01)
*C04B 7/32* (2006.01)
*C04B 28/04* (2006.01)
*C04B 28/06* (2006.01)
*C04B 28/08* (2006.01)
*C04B 40/00* (2006.01)
*C04B 28/02* (2006.01)
*C04B 22/00* (2006.01)
*C04B 22/14* (2006.01)
*C04B 7/02* (2006.01)
*C04B 7/26* (2006.01)
*C04B 7/28* (2006.01)
*C04B 16/04* (2006.01)
*C04B 103/14* (2006.01)
*C04B 111/00* (2006.01)

(52) U.S. Cl.
CPC .............. *C04B 7/3453* (2013.01); *C04B 28/04* (2013.01); *C04B 28/065* (2013.01); *C04B 28/08* (2013.01); *C04B 7/323* (2013.01); *C04B 7/326* (2013.01); *C04B 7/345* (2013.01); *C04B 40/0039* (2013.01); *C04B 2103/14* (2013.01); *C04B 2111/00017* (2013.01); *C04B 2111/00767* (2013.01); *C04B 28/02* (2013.01); *C04B 22/0093* (2013.01); *C04B 22/14* (2013.01); *C04B 7/02* (2013.01); *C04B 7/26* (2013.01); *C04B 7/28* (2013.01); *C04B 16/04* (2013.01); *C04B 28/021* (2013.01)

(58) Field of Classification Search
CPC ............ C04B 7/32; C04B 7/345; C04B 28/04
USPC .......................... 106/692, 695, 709, 713, 714
See application file for complete search history.

(56) References Cited

U.S. PATENT DOCUMENTS

| 6,113,684 | A  | * | 9/2000  | Kunbargi .................... 106/692 |
| 6,406,534 | B1 |   | 6/2002  | Kunbargi |
| 6,758,896 | B2 |   | 7/2004  | Kunbargi |
| 7,150,786 | B2 |   | 12/2006 | Kunbargi |
| 8,153,552 | B2 |   | 4/2012  | Cau Dit Coumes et al. |
| 8,557,039 | B2 |   | 10/2013 | Jacob et al. |
| 8,574,359 | B2 |   | 11/2013 | Marchi et al. |
| 2002/0164485 | A1 |  | 11/2002 | Martin |
| 2004/0101672 | A1 |  | 5/2004  | Anton et al. |
| 2011/0308431 | A1 |  | 12/2011 | Pasquier et al. |
| 2012/0085265 | A1 |  | 4/2012  | Walenta et al. |

(Continued)

FOREIGN PATENT DOCUMENTS

AT   393 381 B    10/1991
CN   1479700 A     3/2004

(Continued)

OTHER PUBLICATIONS

Belz et al., "Use of Fly Ash, Blast Furnace Slag, and Chemical Gysum for the Synthesis of Calcium Sulfoaluminate-Based Cements", Fly Ash, Silica Fume, Slag and Natural Pozzolans in Concrete. Proceedings International Conference, vol. 1, No. SP-153 (1995), pp. 513-530, XP001011491.
Beretka et al,. "The Influence of $C_4A_3S$ Content and W/S Ratio on the Performance of Calcium Sulfoaluminate-based Cements", Cement and Concrete Research, vol. 26, No. 11 (1996), pp. 1673-1681.
European Search Report, Appl. No. 11006757.6, Jan. 25, 2012, 9 pgs.
European Search Report, Appl. No. 12001488.1, Jun. 27, 2012, 13 pgs.
European Search Report, Appl. No. 12002111.8, Jun. 27, 2012, 15 pgs.
European Search Report, Appl. No. 12002342.9, Jul. 25, 2012, 13 pgs.
European Search Report, Appl. No. 12003718.9, Oct. 11, 2012, 14 pgs.

(Continued)

*Primary Examiner* — Anthony J Green
(74) *Attorney, Agent, or Firm* — Paul D. Strain, Esq.; Strain & Strain PLLC

(57) ABSTRACT

The present invention relates to the production of ternesite clinkers containing 20 to 100% by weight $C_5S_2\$$ and less than 15% by weight $C_4A_3\$$, and to the use of ternesite as an additive to Portland cement or Portland composite cement, and to a binder containing 20 to 95% by weight Portland cement (clinker) and 80 to 5% by weight ternesite (clinker).

28 Claims, 6 Drawing Sheets

(56) References Cited

U.S. PATENT DOCUMENTS

| | | | |
|---|---|---|---|
| 2013/0118384 | A1 | 5/2013 | Barnes-Davin et al. |
| 2014/0230697 | A1 | 8/2014 | Bullerjahn et al. |
| 2014/0230699 | A1 | 8/2014 | Bullerjahn et al. |
| 2014/0238274 | A1 | 8/2014 | Bullerjahn et al. |
| 2014/0261088 | A1 | 9/2014 | Bullerjhan et al. |
| 2014/0283712 | A1 | 9/2014 | Bullerjahn et al. |

FOREIGN PATENT DOCUMENTS

| | | |
|---|---|---|
| CN | 101952216 A | 1/2011 |
| DE | 21 22 710 A1 | 11/1971 |
| DE | 37 01 717 C1 | 4/1988 |
| DE | 196 44 654 A1 | 4/1998 |
| DE | 198 43 092 A1 | 11/1999 |
| DE | 600 29 770 T2 | 8/2007 |
| DE | 10 2005 054 190 B3 | 10/2007 |
| EP | 0 397 963 A1 | 11/1990 |
| EP | 0 838 443 A1 | 4/1998 |
| EP | 0 858 981 A1 | 8/1998 |
| EP | 0 959 053 A1 | 11/1999 |
| EP | 1 171 398 B1 | 8/2006 |
| EP | 2 159 202 A1 | 3/2010 |
| EP | 2 559 674 A1 | 2/2013 |
| FR | 2 901 270 A1 | 11/2007 |
| FR | 2 928 643 A1 | 9/2009 |
| FR | 2 946 978 A1 | 12/2010 |
| JP | 9-268037 A | 10/1997 |
| JP | 2001-130945 A | 5/2001 |
| WO | WO 98/18740 A1 | 5/1998 |
| WO | WO 2005/097700 A2 | 10/2005 |
| WO | WO 2012/055517 A1 | 5/2012 |
| WO | WO 2013/023728 A2 | 2/2013 |
| WO | WO 2013/023729 A2 | 2/2013 |
| WO | WO 2013/023730 A2 | 2/2013 |
| WO | WO 2013/023731 A2 | 2/2013 |
| WO | WO 2013/023732 A2 | 2/2013 |

OTHER PUBLICATIONS

International Search Report, PCT/EP2012/002974, Feb. 8, 2013, 3 pgs.
International Search Report, PCT/EP2012/002975, Feb. 8, 2013, 4 pgs.
International Search Report, PCT/EP2012/002976, Feb. 8, 2013, 4 pgs.
International Search Report, PCT/EP2012/002977, Feb. 8, 2013, 3 pgs.
International Search Report, PCT/EP2012/002978, Feb. 8, 2013, 2 pgs.
International Search Report, PCT/EP2012/002979, Feb. 8, 2013, 4 pgs.
Irran et al., "Ternesit, $Ca_5(SiO_4)SO_4$, a new Mineral from the Ettringer Bellerberg/Eifel, Germany", Mineralogy and Petrology, vol. 60, No. 1-2 (1997), pp. 121-132.
Kurdowski et al., "Mineral Composition of Build-Up in Cement KILN Preheater", Journal of Thermal Analysis and Calorimetry, vol. 55 (1999), pp. 1021-1029.
Marroccoli et al., Synthesis of Calcium Sulfoaluminate Cements From $Al_2O_3$-Rich By-products From Aluminium Manufacture, $2^{th}$ International Conference on Sustainable Construction Materials and Technologies Jun. 28-30, 2010, University Politecnica Delle Marche, Ancona, Italy, No. 2 (2010), pp. 1-9, XP002645670.
Sherman et al., "Long-term behaviour of hydraulic binders based on calcium sulfoaluminate and calcium sulfosilicate", Cement & Concrete Research, vol. 25, No. 1 (1995), pp. 113-126.
Stark, "Zernent and Kalk: Der Baustoff als Werkstoff", Jan. 1, 2000. Birkhauser. Basel, XP002679558, ISBN: 3-7643-6216-2, pg. 61.
Belz et al., "Synthesis of Special Cements from Mixtures Containing Fluidized Bed Combustion Waste, Calcium Carbonate and Various Sources of Alumina", 28th Meeting of the Italian Section of The Combustion Institute (2005), pp. 1-4-1-1-4-6.
Belz et al., "Fluidized Bed Combustion Waste as a Raw Mix Component for the Manufacture of Calcium Sulphoaluminate Cements", 29th Meeting of the Italian Section of The Combustion Institute (2006), pp. IX4.1-1X4.5.
English translation of International Preliminary Report on Patentability, PCT/EP2012/002974, Feb. 20, 2014.
English translation of International Preliminary Report on Patentability, PCT/EP2012/002975, Feb. 20, 2014.
English translation of International Preliminary Report on Patentability, PCT/EP2012/002976, Feb. 20, 2014.
English translation of International Preliminary Report on Patentability, PCT/EP2012/002977, Feb. 27, 2014.
English translation of International Preliminary Report on Patentability, PCT/EP2012/002978, Feb. 20, 2014.
English translation of International Preliminary Report on Patentability, PCT/EP2012/002979, Feb. 27, 2014.
Jewell et al., "The Fabrication of Value Added Cement Products from Circulating Fluidized Bed Combustion Ash", 2007 World of Coal Ash (WOCA), May 7-10, 2007, Northern Kentucky, USA, 11 pgs.
Kapralik et al., "Phase Changes in the System $CaO-Al2O3-SiO2-Fe2O3-MgO-CaSO4-K2SO4$ in Ar up to 1300 °C referred to Sulphoaluminate Cement Clinker", Br. Ceram. Trans. J., vol. 85 (1986), pp. 131-136.
Sahu et al., "Phase compatibility in the system $CaO-SiO2-Al2O3-Fe2O3-SO3$ referred to sulphoaluminate belite cement clinker", Cement and Concrete Research, vol. 23 (1993), pp. 1331-1339.
Bullerjahn, U.S. PTO Office Action, U.S. Appl. No. 14/239,339, Jun. 27, 2014, 16 pgs.
Bullerjahn, U.S. PTO Office Action, U.S. Appl. No. 14/238,872, Jul. 21, 2014, 14 pgs.
Bullerjahn, U.S. PTO Office Action, U.S. Appl. No. 14/239,348, Jun. 30, 2014, 15 pgs.
Beretka et al. "Synthesis and Properties of Low Energy Cements based on C4A3S", 9th International Congress on the Chemistry of Cement (1992), pp. 195-200.
Beretka et al., "Utilisation of industrial wastes and by-products for the synthesis of special cements", Resources, Conservation and Recycling, vol. 9 (1993), pp. 179-190.
Calos et al., Structure of Calcium Aluminate Sulfate $Ca4Al6O16S$, Journal of Solid State Chemistry, vol. 119 (1995), pp. 1-7.
Schmidt et al. "Quantification of Calcium Sulpho-Aluminate Cement by Rietveld Analysis", Materials Science Forum, vols. 321-324 (2000), pp. 1022-1027.
Japanese Office Action, Application No. 2014-525336, Mar. 3, 2015, 4 pgs.
Odler, Special Inorganic Cements:, (2000), pp. 65, 66, 78, ISBN: 0-419-22790-3, https://books.google.co.jp/books?id=p6YTKgk8mBgC&pg=PA66&dg=C4A3&f=false.
Makhmudova et al., "Synthesis and Properties of Sulphoferrite Calcium Clinkers and Low Temperature Cements on their Basis", Journal of the University of Chemical Technology and Metallurgy, vol. 46, No. 2 (2011), pp. 151-154.
"CaO—Al2O3—SO3—SiO2", P051045:10946, Mar. 11, 2015, pp. 95-98.
Li et al., "Microwave sintering of sulphoaluminate cement with utility wastes", Cement and Concrete Research, vol. 31, No. 9 (2001), pp. 1257-1261.
Bullerjahn, U.S. PTO Notice of Allowance, U.S. Appl. No. 14/238,872, Dec. 16, 2014, 14 pgs.
Bullerjahn, U.S. PTO Notice of Allowance, U.S. Appl. No. 14/239,339, Jan. 12, 2015, 13 pgs.
Bullerjahn, U.S. PTO Notice of Allowance, U.S. Appl. No. 14/239,348, Jan. 5, 2015, 11 pgs.
Chinese Search Report and English translation thereof, Appl. No. 201280040006.0, Apr. 28, 2015, 4 pgs.
Chinese Office Action and English translation thereof, Appl. No. 201280040095.9, Mar. 19, 2015, 16 pgs.
Bullerjahn, U.S. PTO Office Action, U.S. Appl. No. 14/238,947, Mar. 25, 2015, 21 pgs.
Bullerjahn, U.S. PTO Office Action, U.S. Appl. No. 14/238,976, Apr. 16, 2015, 22 pgs.

(56) References Cited

OTHER PUBLICATIONS

Chinese Office Action and English translation thereof, Appl. No. 201280040099.7, Feb. 13, 2015, 21 pgs.

Bullerjahn, U.S. PTO Notice of Allowance, U.S. Appl. No. 14/239,339, May 8, 2015, 12 pgs.

Bullerjahn, U.S. PTO Notice of Allowance, U.S. Appl. No. 14/239,348, May 12, 2015, 11 pgs.

Bullerjahn, U.S. PTO Notice of Allowance, U.S. Appl. No. 14/238,872, May 8, 2015, 12 pgs.

* cited by examiner

FIG. 1: Heat flow of the hardened cement pastes Aqu-K and Aqu-K-T$_{pur}$
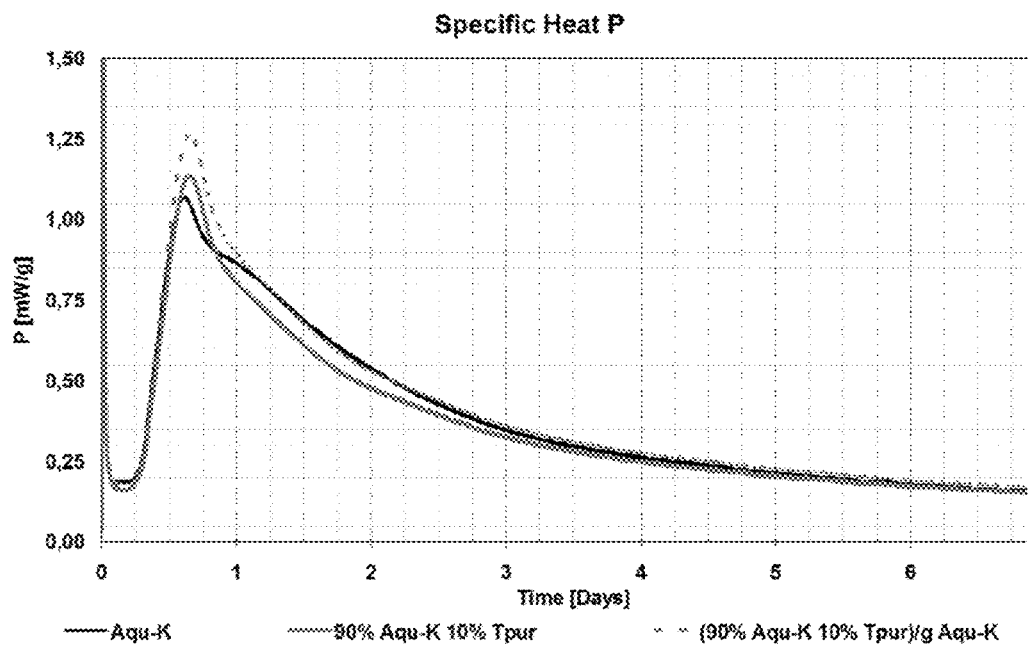
FIG. 2: Heat flow of the hardened cement pastes Aqu-K and Aqu-K-T$_{FA}$
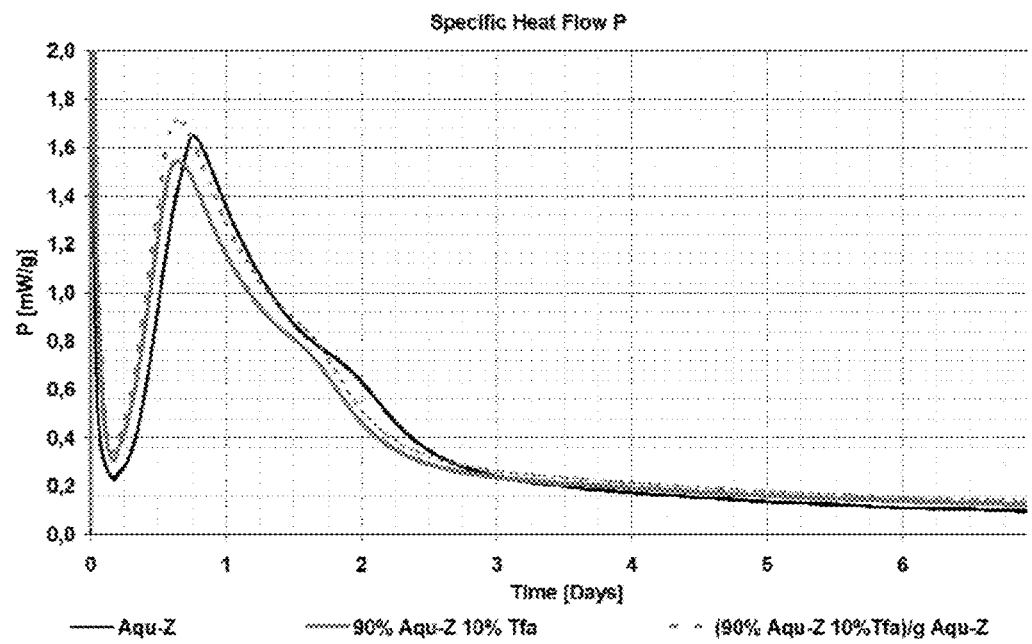

FIG. 3: Heat flow of the hardened cement pastes Aqu-K and Aqu-K-T$_{AGS}$
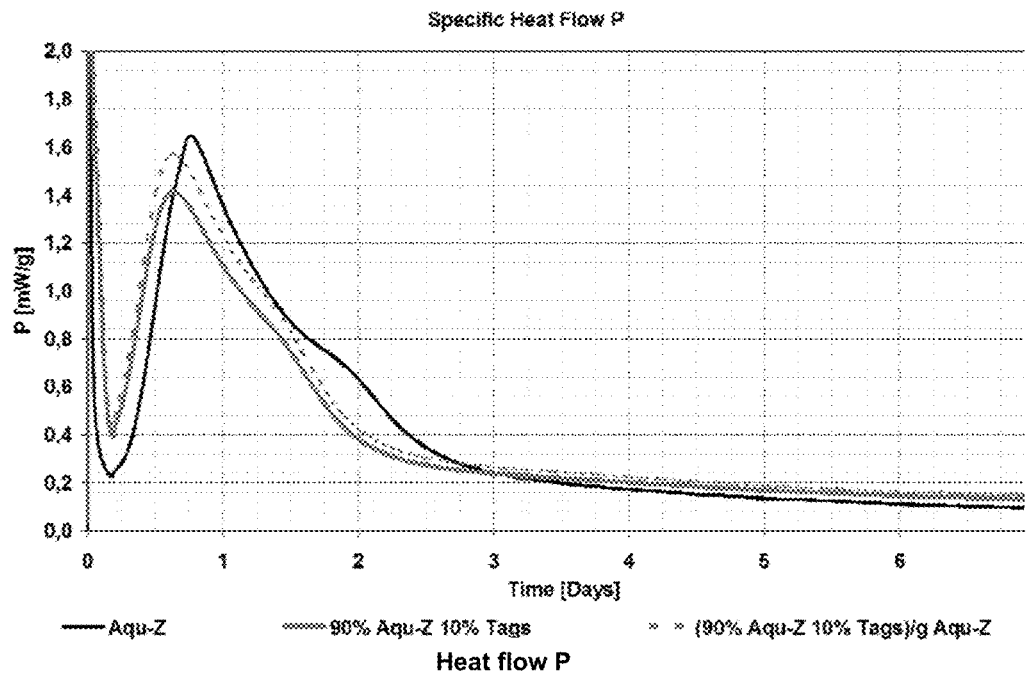
Heat flow P
FIG. 4: Heat flow of the hardened cement pastes BFS and BFS-T$_{pur}$
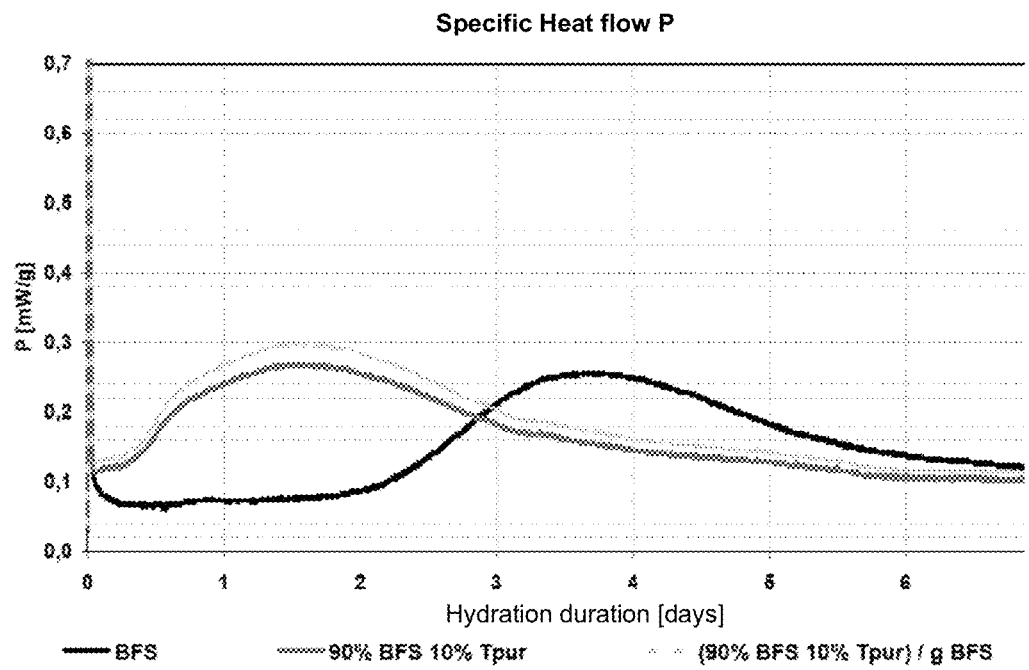

FIG. 5: Loss of weight (combined water) after 28 days
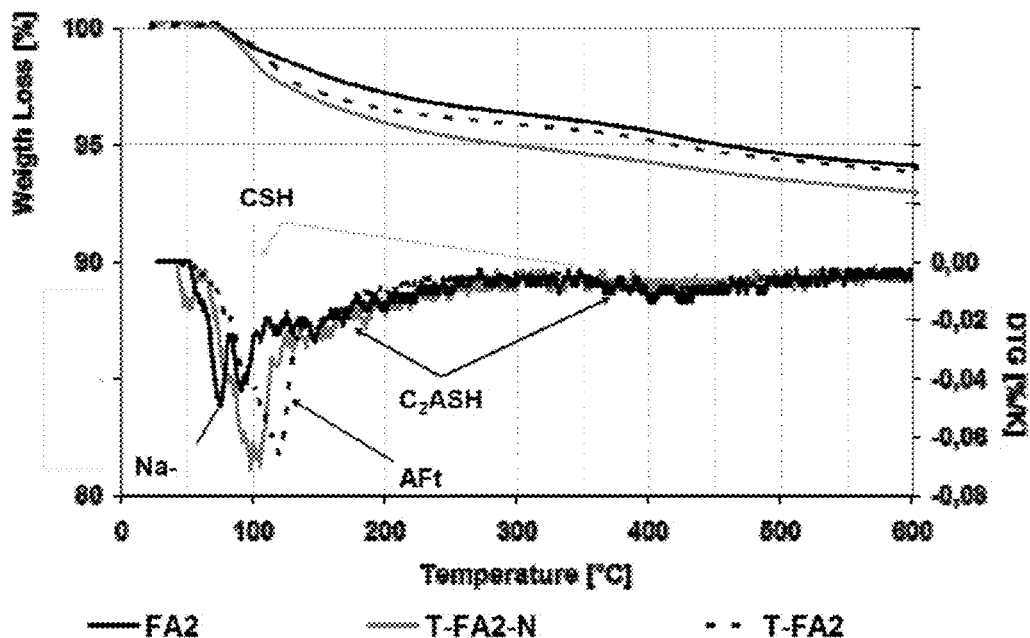
FIG. 6: Loss of weight (combined water) after 28 days
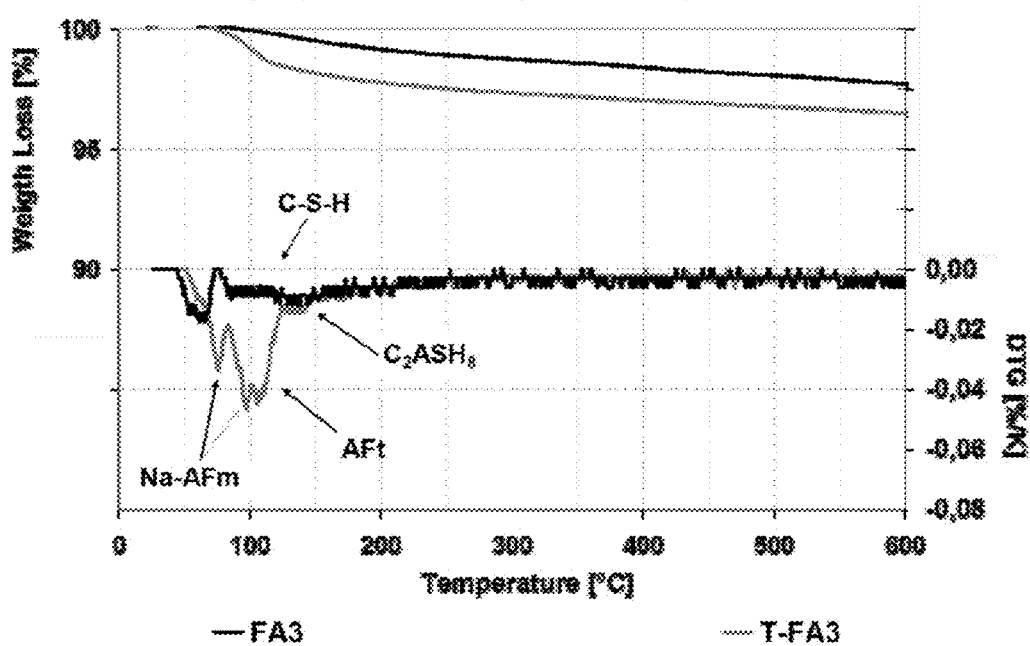

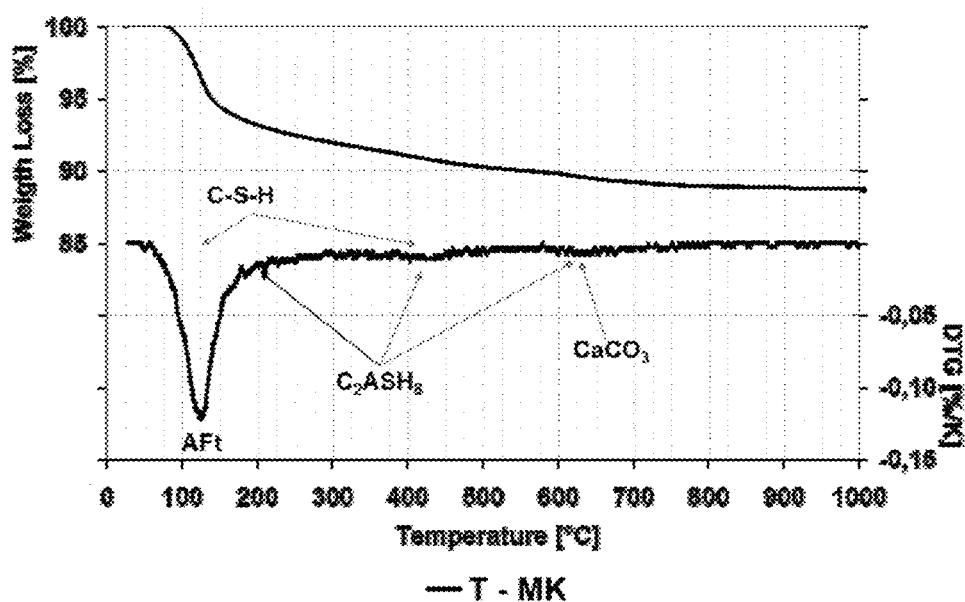
FIG. 7: Loss of weight (combined water) after 7 days

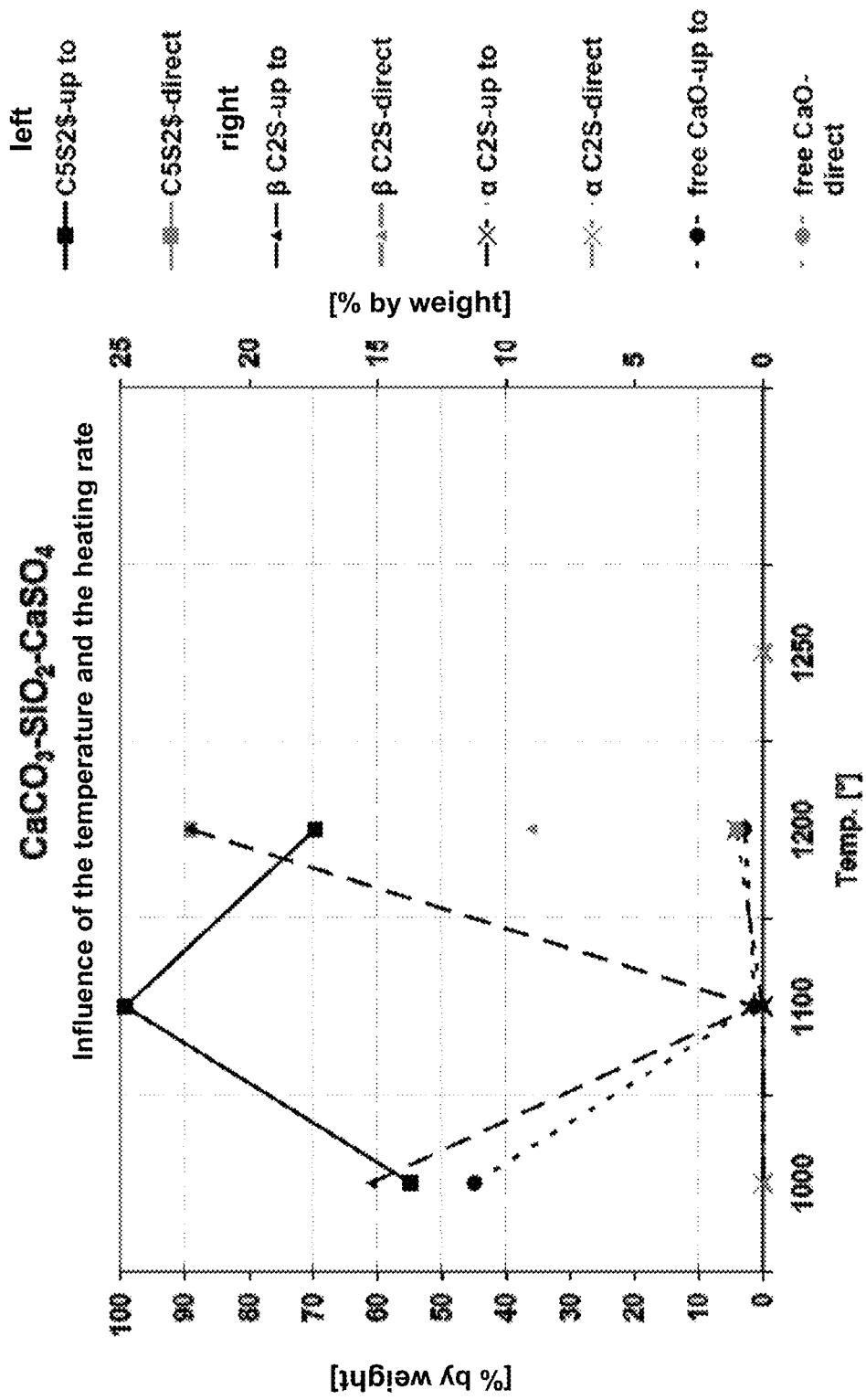
FIG. 8: Mineralogy of the clinkers that were produced (QXRD according to Rietveld); up to = sample was heated from 20°C to the target temperature (between 30 and 45 minutes) direct = sample was annealed directly at the target temperature

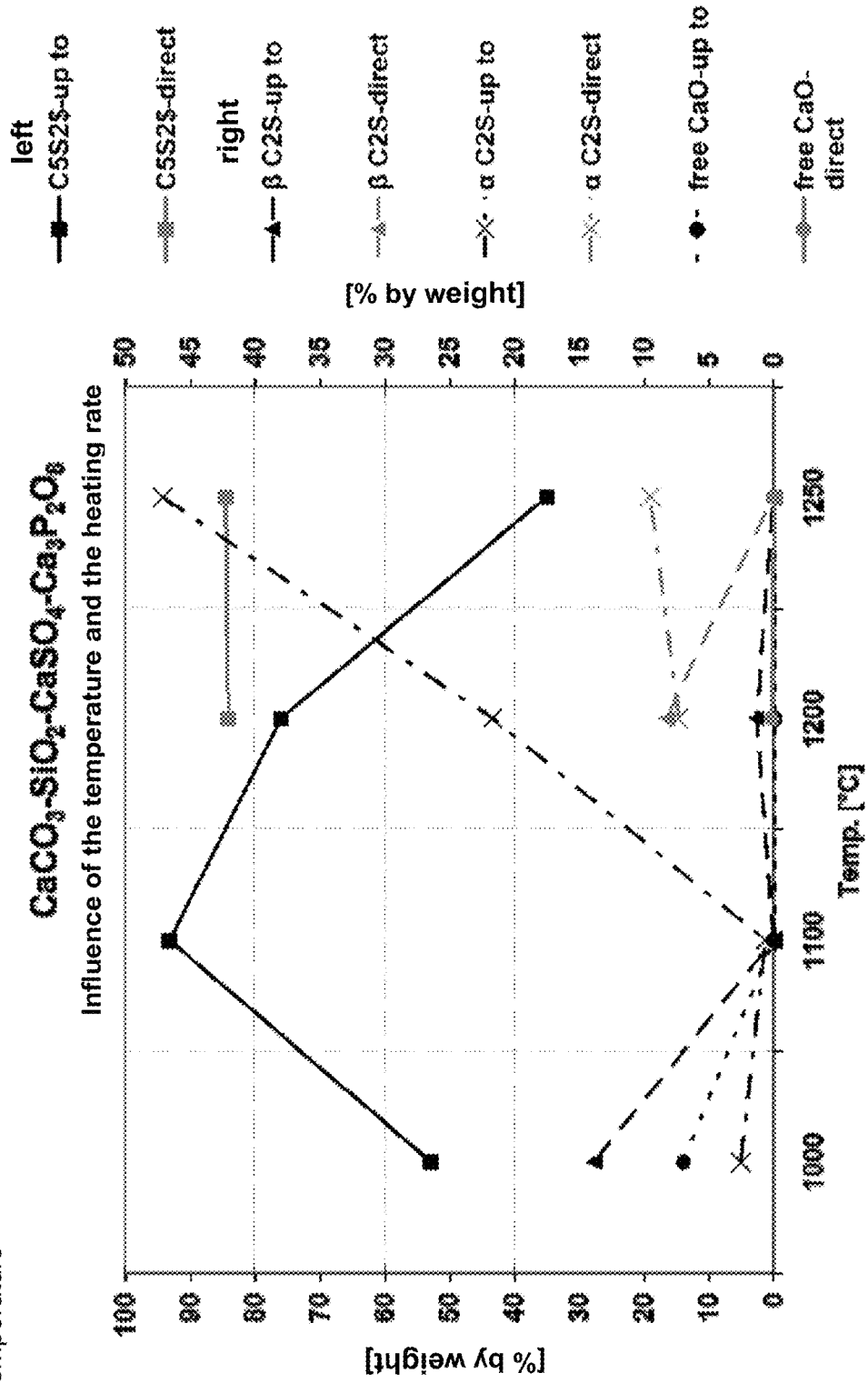
FIG. 9: Mineralogy of the clinkers that were produced (QXRD according to Rietveld); up to = sample was heated from 20°C to the target temperature (between 30 and 45 minutes) direct = sample was annealed directly at the target temperature

TERNESITE USED AS AN ADDITIVE IN PORTLAND CEMENT

CROSS-REFERENCE TO RELATED PATENT APPLICATIONS

This application is a National Stage of International Application No. PCT/EP2012/002974, filed Jul. 16, 2012, which is based upon and claims the benefit of priority from prior European Patent Applications No. 11006757.6, filed Aug. 18, 2011, No. 11008570.1, filed Oct. 26, 2011, No. 12001488.1, filed Mar. 5, 2012, No. 12002111.8, filed Mar. 26, 2012, No. 12002342.9, filed Mar. 30, 2012, and No. 12003718.9, filed May 10, 2012, the entire contents of all of which are incorporated herein by reference in their entirety.

The present invention relates to the production and the use of ternesite as an additive to Portland cement and binders.

The cement industry accounts for a considerable portion of the global production of $CO_2$. Over the last few years, the worldwide growing demand for cement, notably in developing countries, as well as rising costs for raw materials, energy and $CO_2$ certificates have resulted in an increasing reduction of the clinker factor, for example by adding limestone powders, fly ash and ground granulated blast furnace slag as clinker replacement materials. This use of byproducts and waste products from other industries as well as the development of alternative binders are increasingly becoming the focus of attention in politics, science and business.

Around the world, enormous amounts of materials are incurred as part of thermal waste disposal/energy generation, steel production, noble metal extraction and the like, which hereinafter will be referred to as industrial byproducts. Depending on the quality/composition/field of application, some or all of these can be reused in various processes and products, for example as correcting agents for the clinker production for Portland cement, as additives for concrete, and as aggregates for asphalt and concrete, and the like.

However, due to various factors, for example the lack of uniformity (chemism and mineralogy) and the content of harmful substances (organic chemistry, heavy metals, and the like), the use of industrial byproducts entails some problems. Among other things, a decreasing reactivity/quality of OPC clinkers or insufficient volume stability of cements can cause large quantities of such materials to be disposed of at great expense every year or used as waste dump materials and landfill materials. Difficulties can also occur with the disposal of such materials, for example leaching processes may contaminate surrounding areas and water systems/groundwater. The use/treatment of industrial byproducts thus constitutes a major challenge and a problem that has yet to be resolved. In the future, the most efficient and sustainable use of resources will be indispensable and have relevance around the world.

The following abbreviations, which are common in the cement industry, will be used: H—$H_2O$, C—CaO, A-$Al_2O_3$, F—$Fe_2O_3$, M-MgO, S—$SiO_2$ and \$-$SO_3$. So as to simplify the further description, compounds are generally indicated in the pure forms thereof, without explicitly stating series of solid solutions/substitution by foreign ions and the like, as they are customary in technical and industrial materials. As any person skilled in the art will understand, the composition of the phases mentioned by name in the present invention may vary, depending on the chemism of the raw meal and the type of production, due to the substitution with various foreign ions, such compounds likewise being covered by the scope of the present invention and comprised by the designation of the pure phases/compounds.

PRIOR ART

EP 1 171 398 B1 (DE 600 29 779 T2) describes the sintering of specific/selected raw materials, which are almost exclusively of natural origin, and at least one source for $CaF_2$, at 900 to 1200° C., so as to produce special clinkers in the kiln which have high concentrations of crystal X={(C, K, N, M)$_4$ (A, F, Mn, P, T, S)$_3$(Cl, \$)} and crystal Y={$C_2S$)$_3$($C\$$)$_3$Ca(f, Cl)$_2$ or $C_9S_3\$_3$Ca(f,cl)$_2$} [mineral from the group of ellestadites] and/or crystal Z={$C_5S_2\$$}. These clinkers are mixed with hydraulic cement or cement of the Portland type to produce finished cement compositions, wherein the content of crystal X accounts for between 15 and 75% by weight of the special clinker and at least 5% by weight of the final binder mixture.

It was the object of the invention to provide a Portland cement and binder made therefrom, which have a lesser negative impact on the environment, in which industrial byproducts as well as alternative natural raw materials can constitute a portion of the raw meal mixture or be used as a component of the binder.

Surprisingly, it was found that the $C_5S_2\$$ phase (ternesite, also referred to as sulfospurrite or sulfate spurrite or calcium sulfosilicate) constitutes a significantly reactive component in combination with reactive aluminum. In contrast, the literature (see, for example, "Synthesis of Calcium Sulfoaluminate Cements From $Al_2O_3$-Rich By-products from Aluminium Manufacture", Milena Marroccoli et al., The second international conference on sustainable construction materials and technologies 2010, "Synthesis of Special Cements from Mixtures Containing Fluidized Bed Combustion Waste, Calcium Carbonate and Various Sources of Alumina", Belz et al, 28th Meeting of the Italian Section of The Combustion Institute 2005, "Fluidized Bed Combustion Waste as a Raw Mix Component for the Manufacture of Calcium Sulphoaluminate Cements", Belz G et al, 29th Meeting of the Italian Section of The Combustion Institute, 2006 and "The Fabrication of Value Added Cement Products from Circulating Fluidized Bed Combustion Ash", Jewell R. B et al, World of Coal Ash (WOCA) Covington, Ky., USA, 2007) describes the $C_5S_2\$$ phase as being less reactive or inert and as undesirable in calcium sulfoaluminate cement. In addition, methods for avoiding this "undesirable phase" are highlighted on a regular basis. It was surprising to find during our experiments that a significant amount of this $C_5S_2\$$ phase reacts already within the first few days of hydration and significantly influences the phase composition of the hydrated samples.

The above object is thus solved by a method for producing ternesite clinker and the addition of ternesite to Portland cement clinker or cement, in which ternesite clinker is obtained by sintering a raw meal mixture containing at least sources for CaO, $SiO_2$ and $SO_3$, wherein the sintering temperature is adjusted such that the ternesite clinker contains at least 20% by weight $C_5S_2\$$, relative to the total weight of the clinker. Before or after grinding, the ternesite clinker is mixed with a Portland cement clinker or Portland cement, respectively, to form a binder.

Within the context of the present invention, clinker shall mean a sinter product which is obtained by burning a raw material mixture at an elevated temperature and which contains at least one hydraulically reactive phase. Cement denotes a clinker that is ground with or without adding further components. Binder or binder mixture denotes a hydraulically hardening mixture containing cement and typically, but not necessarily, additional finely ground components, and which is used after adding water, optionally admixtures and aggregate.

A clinker may already contain all the necessary or desired phases and be used directly as a binder after being ground to form cement. According to the invention, the composition of the binder is obtained by mixing two or more clinkers and/or cements, wherein the mixing takes place already before (or during) the grinding and/or in the ground state and/or during production of the binder. Unless a time is specifically indicated for mixing, the following descriptions concern binders (and cements) which are not restricted in this regard.

Unless indicated otherwise, the term "reactive" shall denote hydraulic reactivity.

Within the context of the present invention, Portland composite cement shall mean a product in which at least a portion, and as much as the predominant portion, of the ground Portland cement clinker is substituted by at least one other material, which includes, for example, but is not limited to, other hydraulic, latent hydraulic, pozzolanic, inert materials. Substitution rates typically range from >5 to 70%.

Phases such as $C_5S_2\$$, for example, are primarily indicated stoichiometrically, however the exact composition may deviate/vary. Moreover, various foreign ions from the group of the halogens, nonmetals, alkali and alkaline earth metals as well as materials from the transition metals, metalloids and metals can be added to the crystal structure of the phase. These are all suitable for the clinker according to the invention. Preferably, for example, phosphate, fluoride, nitrate or chloride as well as sodium and potassium are added to the structure of $C_5S_2\$$, whereby the same is stabilized (for example at elevated temperatures >1200° C.) and/or is formed more quickly, such materials hereinafter being collectively referred to as mineralizers.

Mineralizers shall be understood to mean substances which act as flux and/or lower the temperature that is required to form a melt and/or such which are favorable in terms of the formation of the clinker compound, such as by solid solution formation and/or phase stabilization, for example.

Seperately producing ternesite, or a clinker or cement containing ternesite as at least one of the main components, has the advantage that ternesite or this clinker can be produced in one step in a temperature range of typically 900 to 1200° C., and preferably 1050 to 1150° C. The clinker thus generated is very porous and easy to grind, and the reactivity of the clinker can be adjusted or optimized in accordance with the respective requirements of the binder, for example by specifically increasing the contents of $\alpha\ C_2S$ and of the $C_5S_2\$$ phase. This can likewise be achieved by adding mineralizers to the raw meal, wherein a portion, and as much as the predominant portion, of the dicalcium silicate is present in the form of solid solutions or doped "$\alpha$" $C_2S$, for example in the presence of $P_2O_5$ as calcium phosphate silicate $[Ca_2SiO_4 \cdot 0.05Ca_3(PO_4)_2]$. This is favorable in terms of the formation of a melt phase or triggers the same. The formation of a melt phase can be deliberately controlled in order to minimize, for example, the formation of dust, but also to adjust desired properties of the clinker product (reactivity, grindability, and the like).

A targeted production of a $C_5S_2\$$ clinker, the stabilization of $C_5S_2\$$ at elevated temperatures, the potentially increased formation rate of $\alpha\ C_2S$, solid solutions of dicalcium silicate as well as at least one melt phase in the clinker, and the use of ternesite clinkers as an additive for aluminum-rich systems, have not been previously described. This is a completely novel approach to increasing the early strength and/or durability of binder systems based on Portland cement and Portland composite cement.

A further advantage is, that increased magnesium/periclase contents (>2% by weight) can be adjusted in the clinker according to the invention. Because of the low burning temperature, periclase may be present in a reactive form and contribute to the development of strength/hydration.

$C_5S_2\$$ can be produced by sintering raw materials that supply sufficient amounts of CaO, $SiO_2$ and $SO_3$. Pure or substantially pure raw materials, such as calcium carbonate or calcium oxide, quartz powder or microsilica, and calcium sulfate, are suitable for this purpose. On the other hand, a variety of natural as well as industrial materials, which include, for example, but are not limited to, limestone, bauxite, clay/claystone, calcined clay (for example metakaolin), basalt, peridotite, dunite, ignimbrite, carbonatite, ash/slag/granulated blast furnace slag of high and low quality (mineralogy/glass content, reactivity, and the like), various waste dump materials, red and brown muds, natural sulfate carriers, desulfurization slags, phosphogypsum, gypsum from flue gas desulfurization, titanogypsum, fluorogypsum, and the like, can be used in suitable combinations as the raw material. In addition, substances/substance groups that have not been specifically listed are covered by the scope of protection if they satisfy the minimum chemical requirements as potential raw materials. The raw materials may be pretreated, but do not have to be.

Iron that is present in the raw meal mixture is added to the $C_2AF$ phase, and preferably to the $C_4A_3\$$ phase. The addition of foreign ions can result in a higher formation rate of the phase in the hot zone, which in turn may potentially decrease the required residence time and/or result in a quantitative increase. The term $Al_2O_3(Fe_2O_3)$ as well as the description $C_4(A_xF_{1-x})_3\$$ for the clinker phase denote that part of the aluminum can be replaced with iron, which is to say x is a number from 0.1 to 1.0. Typically, aluminum containing small amounts of iron admixtures is primarily present, however within the context of the invention it is also possible to use considerable quantities of iron, including as much as a predominant content of iron.

Proof of the incorporation of iron is the quantitative decrease of iron-rich phases (for example $Fe_3O_4$, $C_2F$ and $C_4AF$), the increase of the $C_4A_3\$$ or $C_4(A_xFe_{(1-x)})_3\$$ phase, as well as the increase in peak intensities and in the lattice parameter c (Å) [crystal system: orthorhombic] from 9.1610 [PDF number: 01-085-2210, tetracalcium hexaaluminate sulfate(VI)—$Ca_4(Al_6O_{12})(SO_4)$, ICSD Collection Code: 080361, Calculated from ICSD using POWD-12++, (1997), structure: Calos, N. J., Kennard, C. H. L., Whittaker, A. K., Davis, R. L., J. Solid State Chem., 119, 1, (1995)] to 9.1784 [PDF number: 00-051-0162, calcium aluminum iron oxide sulfate—$Ca_4((Al_{0.95}Fe_{0.05}))_6O_{12}(SO_4)$, ICSD Collection Code:—, primary reference: Schmidt, R., Pöll mann, H., Martin-Luther-Univ., Halle, Germany., ICDD Grant-in-Aid, (1999)] to values greater than 9.2000. A potential solid solution formation can also be determined by determining the occupation factors in a Rietveld refinement based on under-occupancies or mixed occupancies of individual atomic positions. Another purely qualitative indicator is the change of color the clinkers, which in some instances is significant. The color of the clinkers changes, for example, from chestnut/ocher brown to green-brown all the way to a light gray hue.

Ternesite also occurs as a mineral, however no deposits are known from which it can be obtained in sufficient quantity or purity, and while the use of "natural" ternesite is possible, it is not economical in practice. A production by the sintering of suitable raw materials is preferred according to the invention.

The raw materials for producing the ternesite clinker according to the invention are ground to customary degrees of fineness in the known manner. Degrees of fineness of 2000 to 10000 $cm^2/g$, preferably ranging from 3000 to 6000 $cm^2/g$, and still more preferably from 4000 to 5000 $cm^2/g$ are suited particularly well. The degree of grinding fineness will primarily depend on the type and composition of the raw material that is used, the burning process (temperature, residence time in the sintering zone, and the like) and the desired properties of the binder as well as the technical possibilities that are available.

If the production is to yield pure $C_5S_2\$$ to as great an extent as possible, raw materials that are selected will be those which contain no, or only few, additional constituents, in addition to the sources for CaO, $SiO_2$ and $SO_3$. The reaction of calcium carbonate with quartz powder and calcium sulfate in the temperature range of 900 to 1200° C., and preferably 1050 to 1150° C., yields $C_5S_2\$$ having a purity of >99%.

However, it is preferred to use the highest possible amount of cost-effective and environmentally compatible raw materials when producing $C_5S_2\$$. Environmentally compatible in the context of the present invention shall mean the lowest possible energy expenditure and/or the conservation of natural raw materials and/or high-quality waste products and byproducts. The use of such materials as a component of the raw meal mixture is not found in the patent EP 1 171 398 B1.

A reaction of approximately 25% of the fly ash FA1 (see examples) with approximately 45% limestone K1, approximately 8% quartz (Merck, analytical grade) and approximately 20% MicroA (natural anhydrite) resulted in a clinker having a $C_5S_2\$$ content of >70%, and with the reaction of ~8% metakaolin, ~58% K1, ~23% MicroA and ~10% $SiO_2$ purities of >80% were achieved.

The reaction of these raw materials is likewise preferably carried out in the temperature range of 900 to 1200° C., and preferably of 1050 to 1150° C. Contrary to the known sintering of the same raw materials with the aim of forming $C_4A_3\$$ at a minimum temperature of 1200° C., here substantially ternesite is formed. Depending on the raw material composition, higher temperatures of up to 1300° C., for example, may also be suitable, for example if relevant amounts of phosphorus are present, as is the case when using phosphogypsum. Contrary to the known methods/clinkers, however the invention focuses on the formation of ternesite, and the sintering temperature is thus optimized for forming the same. At these temperatures, advantageously an increased amount of reactive polymorphs of dicalcium silicate also develop, in addition to ternesite. In the prior art, however, the sintering temperature was optimized for the formation of $C_4A_3\$$, and ternesite should not be formed to the extent possible. In contrast, according to the invention the temperature is selected such that as much ternesite as possible is formed and, to the extent that the raw materials contain sources for $Al_2O_3$ or $Fe_2O_3$, the content of $C_4(A_xF_{(1-x)})_3\$$ is limited to less than 15%. While it would also be possible to use clinkers containing more $C_4(A_xF_{(1-x)})_3\$$, where x is 0.1 to 1, and preferably 0.8 to 0.95, a higher content thereof will come at the expense of ternesite, and the corresponding higher sintering temperature can also adversely affect the reactivity of ternesite.

The temperature range from 900° C. to 1300° C., and preferably from 1050° C. to 1150° C., should be maintained for a period of 10 minutes to 180 minutes, preferably 25 minutes to 120 minutes, and still more preferably 30 minutes to 60 minutes. For the purpose of forming desired further phases during cooling, the clinker can pass through the range from 900° C. to 750° C. for a period of 5 minutes to 120 minutes, and preferably 10 minutes to 60 minutes. Finally, possibly also without delayed cooling by passing through the range from 900° C. to 750° C., the clinker is rapidly cooled down in the known manner, so that additional phase changes are prevented.

Surprisingly, it was also found that the heating rate and the use of mineralizers significantly influence the composition of the clinker and the quantities and contents of the reactive phases. FIGS. 8 and 9 (see Example 7) show the composition of ternesite clinkers, produced from a raw meal mixture, which at different temperatures and heating rates. Experiments were also carried out in the presence of mineralizers ($CaF_2$, $Na_2CO_3$, $K_2CO_3$, $FeCl_3$, $MgCl_2$, and others), with results for the experiments conducted with $Ca_3P_2O_8$ being shown by way of example. It was found that in the case of the pure ternesite clinker, containing no mineralizers, aside from $C_5S_2\$$ also β $C_2S$ and CaO were formed, depending on the selected temperature and heating rate, and that a high heating rate (kiln set to the desired target temperature, which is to say the raw meal was sintered directly at the corresponding temperature) is favorable in terms of the formation of $C_5S_2\$$, even at elevated temperatures. The use of mineralizers shows comparable results for high heating rates. Lower heating rates result almost exclusively in ternesite and polymorphs of α $C_2S$ as well as solid solutions of a dicalcium silicate and the mineralizers, at least one X-ray amorphous phase/a melt phase, no/virtually no β $C_2S$ and no CaO (at high temperatures).

A targeted production of a $C_5S_2\$$ clinker, the stabilization of $C_5S_2\$$ at elevated temperatures, the potentially increased formation rate of α $C_2S$, solid solutions of a dicalcium silicate as well as at least one melt phase in the clinker through the targeted use of mineralizers and control of the heating rate, have not been previously described for ternesite-based clinkers. This is a completely novel approach to producing a novel and highly reactive clinker.

Clinkers containing ternesite as the main component without any significant amounts of ye'elimite have always been avoided until now and are thus novel and likewise the subject matter of the present invention, as is the use thereof as an additive in Portland cement and binders made therefrom.

According to the invention, the clinker containing $C_5S_2\$$ as the main component, or cement obtained therefrom by grinding without additives, includes the following components in the indicated contents:

$C_5S_2\$$ 20 to 100% by weight,
 preferably 30 to 95% by weight, and still more preferably 40 to 90% by weight
(α, β) $C_2S$ 0 to 80% by weight,
 preferably 5 to 70% by weight, and still more preferably 10 to 60% by weight
$C_4(A_xF_{(1-x)})_3\$$ 0 to <15% by weight,
 preferably 3 to 12% by weight, and still more preferably 5 to 10% by weight
$C_2(A_yF_{(1-y)})$ 0 to 30% by weight,
 preferably 5 to 20% by weight, and still more preferably 8 to 15% by weight
reactive aluminates 0 to 20% by weight,
 preferably 1 to 15% by weight, and still more preferably 3 to 10% by weight
periclase (M) 0 to 25% by weight,
 preferably 1 to 15% by weight, and still more preferably 2 to 10% by weight
secondary phases 0 to 30% by weight,
 preferably 3 to 20% by weight, and still more preferably 5 to 10% by weight relative to the total amount of clinker/cement, with the proportions of the phases amounting to 100%.

The designation (α, β) $C_2S$ means that this can be polymorphs of $C_2S$ and mixtures thereof, the reactive α polymorphs (for example α, $α'_L$, $α'_H$) being preferred. Preferably, at least 5% by weight a polymorphs of $C_2S$ are present because these advantageously contribute to high early strength.

By adding mineralizers to the raw meal, a portion, and as much as the predominant portion, of the dicalcium silicate may be present in the form of doped "α" $C_2S$, for example in the presence of $P_2O_5$ as calcium phosphate silicate [$Ca_2SiO_4 \cdot 0.05Ca_3(PO_4)_2$]. Such compounds are likewise covered by the group of reactive α $C_2S$ polymorphs and by the scope of the present invention.

A ternesite clinker containing, among other things, reactive α polymorphs of $C_2S$ and doped "α" $C_2S$ has never before been described and also cannot be found in the patent EP 1 171 398 B1.

In the $C_4(A_xF_{(1-x)})_3\$$ phase, x ranges from 0.1 to 1, and preferably from 0.8 to 0.95.

In the $C_2(A_yF_{(1-y)})$ phase, y ranges from 0.2 to 0.8, and preferably from 0.4 to 0.6.

Reactive aluminates shall be understood to include, for example, but not be limited to, $C_3A$, CA and $C_{12}A_7$.

Secondary phases may include, for example, but are not limited to, alkali/alkaline earth sulfates, quartzes, spinels, olivines, pyroxenes, substances from the melilith and merwinite groups, apatites, ellestadites, silicocarnotite, free lime, spurrite, quartz and/or an X-ray amorphous phase content/a glassy phase, in a content of 0% by weight to 30% by weight, preferably 2% by weight to 20% by weight, and still more preferably 5% by weight to 15% by weight. The content of free lime in the clinker is less than 5% by weight, preferably less than 2% by weight, and still more preferred less than 1% by weight. In a preferred embodiment, the ternesite clinker contains 1 to 10% by weight, preferably 2 to 8% by weight, and still more preferred 3 to 5% by weight of an X-ray amorphous phase/a glassy phase.

A ternesite clinker containing, among other things, an X-ray amorphous phase content/a glassy phase was previously not described and also cannot be found in the patent EP 1 171 398 B1.

The contents of the primary oxides of a separately produced clinker containing $C_5S_2\$$ as the primary phase comprise the following ranges:

CaO 40 to 70% by weight, preferably 45 to 60% by weight, and still more preferably 50 to 55% by weight $SiO_2$ 5 to 30% by weight, preferably 10 to 25% by weight, and still more preferably 15 to 23% by weight $SO_3$ 3 to 30% by weight, preferably 5 to 26% by weight, and still more preferably 8 to 22% by weight $\Sigma(Al_2O_3+Fe_2O_3)$ 0 to 40% by weight, preferably 5 to 30% by weight, and still more preferably 8 to 20% by weight MgO 0 to 25% by weight, preferably 2 to 15% by weight, and still more preferably 5 to 10% by weight relative to the total quantity of clinker/cement, with the proportions of the contents amounting to 100%.

The binder according to the invention and/or the cement according to the invention comprise, as primary phases, at least $C_5S_2\$$ and the $C_2S$, $C_3S$ and $C_2(A_yF_{(1-y)})$ phases typical of Portland cement, where y is from 0.2 to 0.8, and preferably from 0.4 to 0.6, and preferably reactive polymorphs of $C_2S$ from the ternesite clinker. The binder typically also contains alkali and alkaline earth sulfates and may contain free lime. A content of $C_4A_3\$$ does not exceed 5% by weight. The binder preferably also contains admixtures and/or additives, and optionally further hydraulically active components, which include, for example, but not limited to, calcium aluminate cement, geopolymer cement, and calcium sulfoaluminate cement. The additives can be latent hydraulic, pozzolanic and/or not hydraulically active (for example ground limestone/dolomite, precipitated $CaCO_3$, $Mg(OH)_2$, Ca$(OH)_2$, aluminum hydroxide [for example amorphous $Al(OH)_3$], soluble alkali aluminates [for example $Na_2Al_2O_4$], silica fume) components.

Cement and binders can be obtained by admixing ternesite to Portland cement clinker, Portland cement or Portland cement binder.

The binder according to the invention is obtained by combining a Portland cement clinker or Portland cement with a clinker and/or cement, containing 20 to 100% by weight $C_5S_2\$$ to form a cement/binder. Portland cement typically contains 50 to 70% $C_3S$, 10 to 40% $C_2S$, 0 to 15% $C_3A$, 0 to 20% $C_4AF$, 2 to 10% C\$, 0 to 3% C and 0 to 5% Cc. The chemical composition is generally 55 to 75% CaO, 15 to 25% $SiO_2$, 2 to 6% $Al_2O_3$, 0 to 6% $Fe_2O_3$ and 1.5 to 4.5% $SO_3$. The at least two components of the binder mixture are present with the following contents:

Portland cement clinker or Portland cement 20 to 95% by weight, preferably 40 to 90% by weight, and still more preferably 60 to 85% by weight clinker or cement containing $C_5S_2\$$ 5 to 80% by weight, preferably 10 to 60% by weight, and still more preferably 15 to 50% by weight The contents are relative to the total amount of binder, wherein the contents of all components add up to 100%.

The cement or the binder mixture preferably also contains one or more setting and/or hardening accelerator as an admixture, which are preferably selected among components having available aluminum, or such which in contact with water liberate aluminum, for example in the form of $Al(OH)^-_4$ or amorphous $Al(OH)_3$ gel, which include, for example, but are not limited to, soluble alkali aluminates [for example $Na_2Al_2O_4$, $K_2Al_2O_4$, and the like], and amorphous aluminum hydroxide (for example $Al(OH)_3$). Moreover, the cement or the binder mixture may contain one or more setting and/or hardening accelerator as an admixture, likewise in combination with the aforementioned components having available aluminum, preferably selected from lithium salts and hydroxides, other alkali salts and hydroxides, and alkali silicates.

Additives, such as alkali aluminates and alkali salts, silicates and hydroxides, for example, which additionally increase the pH value of the solution and concomitantly the reactivity of $C_5S_2\$$, are particularly preferred and can be metered in an amount ranging from 0.01 to 10% by weight, preferably from 0.5 to 5% by weight, and still more preferably from 1 to 2% by weight.

It is further preferred if concrete plasticizers and/or water reducing admixtures and/or retarders are present, preferably based on lignin sulfonates, sulfonated naphthalene, melamine or phenolformaldehyde condensate, or based on acrylic acid-acrylamide mixtures or polycarboxylate ethers, or based on phosphated polycondensates, phosphated alkylcarboxylic acid and salts thereof, (hydroxy)carboxylic acids and carboxylates, borax, boric acid and borates, oxalates, sulfanilic acid, aminocarboxylic acids, salicylic acid and acetylsalicylic acid, and dialdehydes.

A customary Portland clinker can be ground together with a clinker and/or cement, containing primarily $C_5S_2\$$ in 20 to 100% by weight as well as other sulfate carriers, or it can be ground separately, and subsequently combined to form a cement/binder.

It has been found that synthetic and natural (annealed) pozzolanes (including, for example, but not limited to, brick dust, fly ashes, tuff, trass, sediments having a high content of soluble silica, annealed clays and shale, synthetic glasses, and the like), latent hydraulic materials (including, for example, but not limited to, ground granulated blast furnace slag, synthetic glasses, W fly ashes and the like) and combinations thereof can be added to the binder in relatively high contents (such materials are hereinafter collectively referred to as cementitious materials [CM]). When CM are added, the contents of binder made of ternesite and Portland cement to the contents of such additions and/or mixtures may be:

binder 20 to 95% by weight, preferably 40 to 80% by weight, and still more preferably 50 to 70% by weight
CM 5 to 80% by weight, preferably 20 to 60% by weight, and still more preferably 30 to 50% by weight, the values being relative to the total amount of binder and the contents, together with the remaining binder components, adding up to 100%. In this case, Portland cement can also be referred to as Portland composite cement.

It is particularly preferred if synthetic and natural pozzolanes and latent hydraulic materials are added, which make a contribution of their own to the development of strength with the ternesite. Surprisingly, it was found that in the case of aluminum-rich pozzolanes/latent hydraulic materials, the aluminum thereof, which is liberated during hydration (for example in the form of $Al(OH)^-_4$ or as amorphous aluminum hydroxide (gel)), is reacted with ternesite. It is particularly advantageous that ternesite is able to continuously supply sulfate, so that $Al(OH)^-_4$ or amorphous aluminum hydroxide available at a later time, for example formed due to the reaction of ground granulated blast furnace slag and/or fly ash, can be reacted. Sulfate attacks are prevented at least to a large extent, and generally completely.

In the presence of water, the binder according to the invention forms $AF_t$ and $AF_m$ phases, metal-metal hydroxysalts and $Al(OH)_3$ due to the reaction with, for example, $C_3A$, $C_4AF$, or aluminum from the ground granulated blast furnace slag and/or the fly ash. The formation/liberation of $Al(OH)^-_4$ or as amorphous aluminum hydroxide (gel) results in the progressive reaction of the $C_5S_2\$$ phase and, on the one hand, supplies additional sulfate, which in turn stabilizes $AF_t$ and prevents/reduces a possible transformation into $AF_m$, and on the other hand a reactive form of $C_2S$ is liberated, $C_5S_2\$$ or $(C_2S)_2.C\$ \leftrightarrow 2\ C_2S+1\ C\$$, which can react with water, but also with the available $Al(OH)_3$ and form $C_2AS.8H_2O$ (stratlingite) as well as C-(A)-S—H. The stabilization of $AF_t$ and the consumption of $Al(OH)_3$ as well as the decrease in porosity due to the formation of $C_2AS.8H_2O$ and C-(A)-S—H of the cement according to the invention result in a considerable improvement in the durability, for example, without being limited to this, due to the decrease in the overall porosity and/or the associated pore space and the resistance to a possible sulfate attack.

Preferred pozzolanes/latent hydraulic materials include annealed clays (for example metakaolin) and shale, fly ash, ground granulated blast furnace slags as well as synthetic (pozzolanic and latent hydraulic) glass.

The components of the binder according to the invention can be ground separately or together, and with or without additional sulfate carriers, in the known manner to customary degrees of cement fineness (according to Blaine) from 2000 to 10000 $cm^2$/g, preferably from 3000 to 6000 $cm^2$/g, and still more preferably from 4000 to 5000 $cm^2$/g. Notably alkali and/or alkaline earth sulfates are suitable sulfate carriers, preferably in the form of gypsum and/or hemihydrate and/or anhydrite and/or magnesium sulfate. A preferred embodiment is the joint grinding the latent hydraulic and/or pozzolanic materials with the clinker/cement containing the $C_5S_2\$$.

The clinker containing $C_5S_2\$$, notably if the clinker contains few other phases, can be ground with very low energy expenditure, so that the same can be adjusted to greater degrees of fineness of the $C_5S_2\$$-containing clinker by separate grinding or pre-grinding, for example if higher reactivity (faster reaction/consumption) of $C_5S_2\$$ is desired. If this is required for a special application, the ground product can have a grain size distribution with $d_{50}$ less than 20 µm and $d_{90}$ less than 100 µm, or $d_{50}$ less than 5 µm and $d_{90}$ less than 20 µm, or $d_{50}$ less than 0.1 µm and $d_{90}$ less than 2 µm.

An intensive grinding of the clinker containing $C_5S_2\$$ can result in a phase content of the clinker, e.g. $C_5S_2\$$, being x ray amorphous partly (often 3 to 20%) up to almost totally (>90%). This is always accompanied by a significant increase in reactivity and allows the formulation of novel highly reactive binder systems.

A very finely ground ternesite clinker can add to strength already within the first 24 h to 7 days. Such a grinding is not possible for a clinker containing significant amounts (e.g. 15% or more) of $C_4A_3\$$, since $C_4A_3\$$ is easier to grind than $C_5S_2\$$ and would be ground too fine, therefore. The high reactivity of $C_4A_3\$$ and its high water demand would prevent obtaining a useful binder when $C_5S_2\$$ is ground such finely in a ternesite-calcium sulfoaluminate clinker.

During processing of the cement according to the invention, or of a binder containing the same, a water/binder value of 0.2 to 2 is suitable, preferably of 0.3 to 0.55, and still more preferably of 0.35 to 0.45.

Individual components or component mixtures can be used to produce the binder, depending on the quality and composition of the available raw materials or clinkers.

Portland (composite) cement and Portland cement clinkers are known and available in a variety of compositions. The addition according to the invention benefits primarily binders in which higher amounts of reactive aluminum are available. However, a positive effect also exists with Portland cement having an average content of aluminate/ferrite phases. However, contrary to EP 1 171 398 B1, it is not a reaction with the involvement of ye'elimite (minimum content of $C_4A_3\$$ in the final binder: there ≥5% by weight) that is utilized for creating the strength, but the reaction of the special ternesite clinker, wherein $C_5S_2\$$ is reacted with the aluminates/ferrites from the Portland cement, and optionally from the released reactive aluminum of the admixed CM, and optionally the reactive polymorphs of $C_2S$ make an additional contribution to the strength. This reaction is of great advantage, both with aluminum that is available early and with aluminum that is available later and liberated in particular from CM. Surprisingly, ternesite can also be used as an alternative to customary sulfate carriers. The use of CM cannot be found in the patent EP 1 171 398 B1.

The cement according to the invention, or the binder according to the invention, is excellently suited for immobilizing hazardous waste. A content of adsorptively effective additives, such as zeolites and/or ion exchange resins, is preferred for this purpose. During the immobilization of heavy metals in inorganic binders, a high pH value may be advantageous, which is favorable in terms of the formation of poorly soluble hydroxides. This can be achieved, for example, without being limited to this, by mixing the clinker according to the invention with Portland cement in a binder.

Another advantage of the cement according to the invention, or of the binder mixture produced therefrom, is the formation of different phases during hydration (for example ettringite [$AF_t$], monophases [$AF_m$], metal-metal hydroxysalts [LDH], and the like), which add various heavy metals as well as other harmful substances (chloride, for example, or the like) to the structures thereof and can thus permanently bind them.

The invention will be described based on the following examples, without being limited to the embodiments that are described in detail. Unless stated otherwise or unless the context automatically stipulates to the contrary, the percentage information relates to the weight, in case of doubt to the total weight of the mixture.

The invention also relates to all possible combinations of preferred embodiments, provided they do not mutually exclude each other. The expressions "approximately" or "about" in conjunction with numerical data shall mean that at least values that are higher or lower by 10%, or values that are higher or lower by 5%, and in any case values that are higher or lower by 1%, shall be included.

Table 2 shows the mineralogical phase compositions of the latent hydraulic and/or pozzolanic materials that were used as well as of the Portland cement clinker (Aqu-K) and of the Portland cement (Aqu-Z). The calculated chemical and the measured mineralogical compositions of the ternesite clinker grades are shown in Table 3.

TABLE 1

Elemental composition of the raw materials used (RFA)

| | | | Material | | | | | | |
|---|---|---|---|---|---|---|---|---|---|
| | | Limestone | ground gran. slag | Fly ash Sample | | | Sulfate | Al corr. | Metakaolin |
| RFA | Unit | K1 | BFS | FA1 | FA2 | FA3 | MicroA | Al(OH)$_3$ | MK |
| GV 1050° C. | % | 43.09 | 1.80 | 0.82 | 0.10 | 2.79 | 4.64 | 34.64 | 1.91 |
| SiO$_2$ | | 1.53 | 36.48 | 28.50 | 45.60 | 47.44 | 4.17 | — | 48.00 |
| Al$_2$O$_3$ | | 0.35 | 11.58 | 12.50 | 20.60 | 27.88 | 1.36 | 65.36 | 41.60 |
| TiO$_2$ | | 0.03 | 0.88 | 1.05 | 0.68 | 1.38 | 0.04 | — | 0.00 |
| MnO | | 0.01 | 0.37 | 0.18 | 0.05 | 0.06 | 0.00 | — | 0.00 |
| Fe$_2$O$_3$ | | 0.19 | 0.52 | 5.18 | 8.17 | 5.89 | 0.37 | — | 1.80 |
| CaO | | 54.50 | 38.46 | 37.40 | 19.3 | 7.54 | 37.40 | — | 5.70 |
| MgO | | 0.22 | 7.52 | 4.81 | 2.17 | 2.48 | 1.82 | — | 0.10 |
| K$_2$O | | 0.04 | 0.44 | 0.28 | 1.63 | 1.46 | 0.28 | — | 0.95 |
| Na$_2$O | | 0.00 | 0.18 | 0.07 | 0.30 | 0.59 | 0.06 | — | 0.00 |
| SO$_3$ | | 0.01 | 2.19 | 7.71 | 1.13 | 0.29 | 49.80 | — | 0.00 |
| P$_2$O$_5$ | | 0.01 | 0.00 | 1.27 | 0.22 | 1.77 | 0.00 | — | 0.00 |
| Total | | 99.98 | 100.42 | 99.77 | 99.95 | 99.67 | 99.94 | 100.00 | 100.06 |
| Amorphous | % | / | >99% | 38.0 | 88.0 | 58.9 | — | — | >95 |
| Density | g/cm$^3$ | 2.64 | 2.81 | 2.82 | 2.66 | 2.3 | — | — | 2.54 |
| Grinding fineness acc. to Blaine | cm$^2$/g | 3350 | 4370 | 4380 | 5500 | 4270 | — | — | — |

BRIEF DESCRIPTION OF THE DRAWINGS

FIG. 1 shows heat flow of the hardened cement pastes Aqu-K and Aqu-K-T$_{pur}$.

FIG. 2 shows heat flow of the hardened cement pastes Aqu-K and Aqu-K-T$_{FA}$.

FIG. 3 shows heat flow of the hardened cement pastes Aqu-K and Aqu-K-T$_{AGS}$.

FIG. 4 shows heat flow of the hardened cement pastes BFS and BFS-T$_{pur}$.

FIG. 5 shows loss of weight (combined water) after 28 days.

FIG. 6 shows loss of weight (combined water) after 28 days.

FIG. 7 shows loss of weight (combined water) after 7 days.

FIG. 8 shows mineralogy of the clinkers that were produced (QXRD according to Rietveld).

FIG. 9 shows mineralogy of the clinkers that were produced (QXRD according to Rietveld).

EXAMPLE

Table 1 characterizes the latent hydraulic and/or pozzolanic materials or raw materials that were used to carry out the examples described hereafter, based on the oxidic main constituents and the degrees of grinding fineness thereof. The loss of weight after annealing at 1050° C. is also indicated.

TABLE 2

Mineralogical phase compositions of the fly ashes used, of the Portland cement clinker and cement (QXRD according to Rietveld and TG)

| Mineral | Unit | FA1 | FA2 | FA3 | Aqu-K | Aqu-Z |
|---|---|---|---|---|---|---|
| Quartz | % by weight | 11.5 | 1.3 | 9.8 | — | — |
| Cristobalite | | 0.4 | — | — | — | — |
| Uncombined lime | | 9.3 | 2.8 | 1.1 | — | — |
| Periclase | | 2.8 | — | 0.9 | 2.0 | 1.4 |
| Calcite | | — | — | — | — | 1.6 |
| Portlandite | | — | — | — | — | 1.3 |
| Gypsum | | — | — | — | — | 0.7 |
| Bassanite | | — | — | — | — | 0.9 |
| Anhydrite | | 10.4 | 1.3 | 0.6 | — | 2.7 |
| Arcanite | | — | — | — | 1.3 | 1.0 |
| Mullite | | — | 1.9 | 25.1 | — | — |
| Gehlenite | | 6.3 | — | — | — | — |
| Merwinite | | 4.9 | — | — | — | — |
| Maghemite | | 1.2 | 1.6 | 1.4 | — | — |
| Hematite | | 0.9 | — | 0.8 | — | — |
| Rutile | | — | — | 0.3 | — | — |
| Ye'elimite | | 3.1 | — | — | — | — |
| C$_3$S | | — | 1.0 | — | 36.3 | 32.3 |
| ΣC$_2$S | | 8.1 | 1.4 | 1.1 | 42.8 | 38.4 |
| C$_4$AF | | 3.1 | 0.7 | — | 20.6 | 19.7 |
| Amorphous | | 38.0 | 88.0 | 58.9 | — | — |

Example 1

T$_{pur}$

A stoichiometric mixture of CaCO$_3$ [Merck, analytical grade], CaSO$_4$ [Merck, analytical grade] and quartz powder [Merck, analytical grade] was burned for 1 hour at 1100° C., then rapidly cooled, ground, and again burned for 1 hour at 1100° C. and rapidly cooled.

Example 2

$TK_{FA}$

The raw mixture consisted of 45% by weight limestone (K1)+27% by weight FA1, 20% by weight MicroA and 8% by weight quartz powder (Merck, analytical grade). The raw meal was sintered at 1100° C. and after sintering was subject to a cooling program for annealing, in which the temperature was lowered from 1100° C. to 850° C. over approximately 35 minutes. The clinker was then cooled rapidly in air.

Example 3

$TK_{AGS}$

The raw mixture consisted of 58% by weight K1+8% by weight MK, 24% by weight MicroA and 10% by weight quartz powder (Merck, analytical grade). The raw meal was subject to the same program as in Example 2.

TABLE 3

Chemical (calculated) and mineralogical compositions of the clinkers from Examples 1 to 3

| | $T_{pur}$ | $TK_{FA}$ | $TK_{AGS}$ |
|---|---|---|---|
| Oxides | | | |
| $SiO_2$ | 25.00% | 21.30% | 22.16% |
| $Al_2O_3$ | — | 4.75% | 4.94% |
| $TiO_2$ | — | 0.38% | 0.04% |
| MnO | — | 0.07% | 0.01% |
| $Fe_2O_3$ | — | 1.96% | 0.45% |
| CaO | 58.34% | 53.20% | 55.34% |
| MgO | — | 2.23% | 0.77% |
| $K_2O$ | — | 0.19% | 0.22% |
| $Na_2O$ | — | 0.04% | 0.02% |
| $SO_3$ | 16.66% | 15.44% | 16.06% |
| $P_2O_5$ | — | 0.44% | 0.01% |
| Phases | | | |
| Anhydrite | 0.4 | 0.3 | 0.2 |
| $C_3A$ (cub) | — | 2.2 | — |
| $C_3A$ (orth) | — | 1.2 | 0.4 |
| $C_2S$ a H | — | 2.7 | 1.4 |
| $C_2S$ beta | — | 5.7 | 3.2 |
| $C_2S$ gamma | — | 1.1 | 0.4 |
| $\Sigma C_2S$ | — | 9.5 | 5.0 |
| Ternesite | 99.2 | 74.9 | 85.5 |
| Uncombined lime | <0.1 | 0.3 | 0.3 |
| Periclase | — | 1.2 | 0.5 |
| $C_4A_3S$ | — | 9.3 | 7.0 |
| Augite | — | 1.2 | 1.1 |
| Quartz | 0.4 | — | — |
| Ratios | | | |
| $CaO/Al_2O_3$ | — | 11.21 | 11.21 |
| $Al_2O_3/Fe_2O_3$ | — | 2.42 | 10.92 |
| $SO_3/(Al_2O_3 + Fe_2O_3)$ | — | 2.30 | 2.98 |
| $SO_3/SiO_2$ | 0.67 | 0.72 | 0.72 |
| $CaO/SO_3$ | 3.50 | 3.45 | 3.45 |
| $CaO/SiO_2$ | 2.33 | 2.50 | 2.50 |
| $MgO/SiO_2$ | 0.00 | 0.10 | 0.03 |

Example 4

The interaction of $C_5S_2\$$ with Portland cement clinker and Portland cement was demonstrated by measuring the hydration progression on pastes (W/B=0.5) using an isothermal differential calorimeter (TAM air) (see FIGS. 1 to 3). Moreover, mixtures of Portland cement clinker and Portland cement with $T_{pur}$, $T_{FA}$ and $T_{AGS}$ (+/−FA2) and, for reference, mixtures with the pure clinker and cement, respectively were produced. From the mixtures, pastes were produced using distilled water (W/B=0.5) and stored in hermetically sealed plastic bags at 20° C. The compositions of the mixtures and the water-to-solid ratio of the pastes are shown in Table 5.

TABLE 5

| Mixture | $T_{pur}$ | $T_{FA}$ | $T_{AGS}$ | Aqu-K % | Aqu-Z | FA2 |
|---|---|---|---|---|---|---|
| Aqu-K | | | | 100 | | |
| Aqu-Z | | | | | 100 | |
| Aqu-Z + FA2 | | | | | 50 | 50 |
| Aqu-K + $T_{pur}$ | 10 | | | 90 | | |
| Aqu-K + $T_{FA}$ | | 10 | | 90 | | |
| Aqu-K + $T_{AGS}$ | | | 10 | 90 | | |
| Aqu-Z + $T_{pur}$ | 10 | | | | 90 | |
| Aqu-Z + $T_{FA}$ | | 10 | | | 90 | |
| Aqu-Z + $T_{AGS}$ | | | 10 | | 90 | |
| Aqu-Z + FA2 + $T_{pur}$ | 10 | | | | 45 | 45 |
| Aqu-Z + FA2 + $T_{FA}$ | | 10 | | | 45 | 45 |
| Aqu-Z + FA2 + $T_{AGS}$ | | | 10 | | 45 | 45 |

It was found that all the samples that contained ternesite exhibited earlier solidification and higher strength. Some of the pastes that were produced with the ternesite clinkers according to the invention exhibited solidification and subsequent hardening within as little as 30 minutes to 6 hours. Table 6 summarizes the results of these experiments. "+/−" denotes the initial setting of the pastes, and one or more "+" show the solidification and increasing hardness of the pastes, with "+++" denoting very high strength. During comparative mortar and compressive strength experiments, "+++" correlated with strengths between 2 and 10 MPa. "−" indicates that no perceptible solidification occurred. Experiments conducted with a CEM I 42.5 (Leimen plant of HeidelbergCement AG, DE) produced comparable results.

TABLE 6

| | Time | | | | | | |
|---|---|---|---|---|---|---|---|
| Mixture | 1 h | 2 h | 4 h | 6 h | 1 d | 2 d | 7 d |
| Aqu-K | − | − | −/+ | −/+ | ++ | ++ | +++ |
| Aqu-Z | − | − | + | + | + | ++ | +++ |
| Aqu-Z + FA2 | − | − | − | −/+ | −/+ | ++ | +++ |
| Aqu-K + $T_{pur}$ | − | −/+ | −/+ | −/+ | ++ | ++ | +++ |
| Aqu-K + $T_{FA}$ | + | + | ++ | ++ | ++ | +++ | +++ |
| Aqu-K + $T_{AGS}$ | + | + | ++ | ++ | ++ | +++ | +++ |
| Aqu-Z + $T_{pur}$ | − | − | + | + | ++ | ++ | +++ |
| Aqu-Z + $T_{FA}$ | + | ++ | ++ | ++ | +++ | +++ | +++ |
| Aqu-Z + $T_{AGS}$ | + | ++ | ++ | ++ | +++ | +++ | +++ |
| Aqu-Z + FA2 + $T_{pur}$ | − | −/+ | −/+ | −/+ | ++ | ++ | +++ |
| Aqu-Z + FA2 + $T_{FA}$ | −/+ | −/+ | −/+ | + | ++ | +++ | +++ |
| Aqu-Z + FA2 + $T_{AGS}$ | − | −/+ | + | + | ++ | +++ | +++ |

Example 5

The interaction of $C_5S_2\$$ with latent hydraulic and/or pozzolanic materials, with and without the addition of NaOH, was demonstrated by measuring the hydration progression of pastes made of ground granulated blast furnace slag (BFS) and $T_{pur}$ (for mixtures see Table 7) using an isothermal differential calorimeter (TAM air) (see FIG. 4). Moreover, binder pastes (W/B=0.5) were produced from fly ashes, metakaolin and $C_5S_2\$$ and the contents thereof of combined water were determined after 7 and 28 days, respectively (see FIGS. 5 to 7). Among the pastes containing $T_{pur}$ a considerable shift of the heat development toward earlier times as compared to the pure BFS can be observed. Among the pozzolanic materials, a significant increase in the combined water can be found, which shows the increased formation of hydrate phases and consequently the increased reactivity of these substances. All substances that were tested exhibited increased reactivity in the presence of $C_5S_2\$$ and these mechanisms can be utilized to optimize Portland composite cements, notably in terms of early strength and/or durability.

TABLE 7 mixtures analyzed

| Mixture | Tpur | BFS | FA2 % | FA3 | MK | NaOH % by weight |
|---|---|---|---|---|---|---|
| BFS + $T_{pur}$ | 10 | 90 | | | | |
| FA2 | | | 100 | | | 0.5 |
| FA3 | | | | 100 | | 0.5 |
| $T_{pur}$ + FA2 | 70 | | 30 | | | |
| $T_{pur}$ + FA2-N | 70 | | 30 | | | 0.5 |
| $T_{pur}$ + FA3 | 70 | | | 30 | | 0.5 |
| $T_{pur}$ + MK | 70 | | | | 30 | |

Example 6

A clinker was produced according to Example 1, wherein the sintering temperatures and the heating rate were varied. In an additional mixture, 0.1 mole percent $Ca_3P_2O_8$ was also added, with the CaO content of the mixture remaining the same. FIGS. 8 and 9 show the mineralogical compositions of the clinkers that were produced. Clinkers containing $P_2O_5$ (FIG. 9) show a higher amount of reactive α $C_2S$ polymorphs and solid solutions across all temperatures, the stabilization of $C_5S_2\$$ at elevated temperatures, and consistently lower free lime contents.

The invention claimed is:

1. A binder containing Portland cement in an amount ranging from 20 to 95% by weight and a ternesite cement in an amount ranging from 5 to 80% by weight, the contents adding up to 100%,
wherein the ternesite cement contains 20 to 100% by weight of a clinker phase comprising $C_5S_2\$$ and remaining clinker phases comprising (α; β) $C_2S$, $C_4(A_xF_{(1-x)})_3\$$, where x is from 0.1 to 1.0, $C_2(A_yF_{(1-y)})$, where y is from 0.2 to 0.8, reactive aluminates, periclase (M), and secondary phases, which are present in the following contents:

| | |
|---|---|
| (α, β) $C_2S$ | 0 to 80% by weight |
| $C_4(A_xF_{(1-x)})_3\$$ | 0 to <15% by weight |
| $C_2(A_yF_{(1-y)})$ | 0 to 30% by weight |
| reactive aluminates | 0 to 20% by weight |
| periclase (M) | 0 to 25% by weight |
| secondary phases | 0 to 30% by weight, | wherein the contents of the clinker phases add up to 100%.

2. The binder according to claim 1, wherein the binder contains the Portland cement in an amount ranging from 40 to 90% by weight, and the ternesite cement in an amount ranging from 10 to 60% by weight, wherein the contents add up to 100%.

3. The binder according to claim 1, wherein natural and/or synthetic latent hydraulic materials and/or pozzolans are present, wherein the amounts of binder from ternesite and Portland cement relative to the amount of such additions or mixtures thereof are present in the following ranges:
binder from 20 to 95% by weight, and
natural and/or synthetic latent hydraulic materials and/or pozzolans from 5 to 80% by weight,
wherein the ranges are relative to the total amount of binder and the amounts of natural and/or synthetic hydraulic materials and/or pozzolans add up to 100% with the remaining binder components.

4. The binder according to claim 3, wherein the latent hydraulic materials and/or pozzolans are selected from the group consisting of brick dust, fly ashes, tuff, trass, sediments having soluble silica, annealed clays and shale, pozzolanic synthetic glasses, ground granulated blast furnace slag, latent hydraulic synthetic glasses, calcium fly ashes, and combinations thereof.

5. The binder according to claim 1, wherein the binder additionally contains further hydraulically reactive materials, and/or not hydraulically reactive materials in a range from 1 to 30% by weight.

6. The binder according to claim 1, wherein the binder contains one or more setting accelerators and/or hardening accelerators as an admixture in an amount ranging from 0.01 to 15% by weight.

7. The binder according to claim 1, wherein the binder contains lithium salts and hydroxides and/or other alkali salts and hydroxides and alkali silicates as admixtures or further admixtures.

8. The binder according to claim 2, wherein the amount of Portland cement ranges from 60 to 85% by weight, and the amount of ternesite cement ranges from 15 to 40% by weight.

9. The binder according to claim 2, wherein the amount of binder ranges from 40 to 80% by weight, and the amount of natural and/or synthetic latent hydraulic materials and/or pozzolans ranges from 20 to 60% by weight.

10. The binder according to claim 2, wherein the amount of binder ranges from 50 to 70% by weight and the amount of natural and/or synthetic latent hydraulic materials and/or pozzolans ranges from 30 to 50% by weight.

11. The binder according to claim 5, wherein the further hydraulically reactive material is selected from the group consisting of calcium aluminate cement, geopolymer cement, calcium sulfoaluminate cement and mixtures thereof.

12. The binder according to claim 5, wherein the not hydraulically reactive material is selected from the group consisting of ground limestone, precipitated $CaCO_3$, $Ca(OH)_2$, $Mg(OH)_2$, silica fume, and combinations thereof.

13. The binder according to claim 6, wherein the admixture is a component having available aluminum, which in contact with water liberates aluminum.

14. The binder according to claim 13, wherein the component is selected from the group consisting of soluble alkali aluminates and amorphous aluminum hydroxide.

15. The binder according to claim 7, wherein the further admixture is selected from the group consisting of alkali salts, silicates, and hydroxides, which increase a pH value of the solution and consequently a reactivity of $C_5S_2\$$.

16. The binder according to claim 2, wherein natural and/or synthetic latent hydraulic materials and/or pozzolans are present, wherein amount of binder from ternesite and Portland cement relative to the amount of such additions or mixture thereof are present in the following ranges:
binder from 20 to 95% by weight, and
natural and/or synthetic latent hydraulic materials and/or pozzolans from 5 to 80% by weight,
wherein the ranges are relative to the total amount of binder and the amounts of natural and/or synthetic latent hydraulic materials and/or pozzolans add up to 100% with the remaining binder components.

17. The binder according to claim 8, wherein the amount of binder ranges from 50 to 70% by weight and the amount of natural and/or synthetic latent hydraulic materials and/or pozzolans ranges from 30 to 50% by weight.

18. The binder according to claim 2, wherein the binder contains one or more setting accelerators and/or hardening accelerators as an admixture in an amount ranging from 0.01 to 15% by weight.

19. The binder according to claim 2, wherein natural and/or synthetic latent hydraulic materials and/or pozzolans are present, wherein the amounts of binder from ternesite and Portland cement relative to the amount of such additions or mixture thereof are present in the following ranges:
  binder from 20 to 95% by weight, and
  natural and/or synthetic latent hydraulic materials and/or pozzolans from 5 to 80% by weight,
  wherein the ranges are relative to total amount of binder and the amounts of natural and/or synthetic latent hydraulic materials and/or pozzolans add up to 100% with remaining binder components, and wherein the binder contains lithium salts and hydroxides and/or other alkali salts and hydroxides and alkali silicates as admixtures or further admixtures.

20. A method for producing a binder containing Portland cement, wherein the binder comprises a ternesite clinker, which contains 20 to 100% by weight of a clinker phase comprising $C_5S_2\$$ and further clinker phases comprising $(\alpha; \beta)$ $C_2S$, $C_4(A_xF_{(1-x)})_3\$$, where x is from 0.1 to 1.0, $C_2(A_yF_{(1-y)})$, where y is from 0.2 to 0.8, reactive aluminates, periclase (M), and secondary phases, which are present in the following contents:

| | |
|---|---|
| $(\alpha, \beta)$ $C_2S$ | 0 to 80% by weight |
| $C_4(A_xF_{(1-x)})_3\$$ | 0 to <15% by weight |
| $C_2(A_yF_{(1-y)})$ | 0 to 30% by weight |
| reactive aluminates | 0 to 20% by weight |
| periclase (M) | 0 to 25% by weight |
| secondary phases | 0 to 30% by weight, | wherein contents of the clinker phases add up to 100%,
the method comprising sintering a raw meal mixture,
  which contains at least sources for CaO, $SiO_2$, and $SO_3$,
  wherein a temperature during sintering is adjusted in the range of 900 to 1300° C. such that the ternesite clinker has a content of $C_5S_2\$$ in the range from 20 to 100% by weight and a content of $C_4(A_xF_{(1-x)})_3\$$ of less than 15% by weight, in each case relative to the total weight of the clinker, or a cement produced therefrom, in an amount ranging from 5 to 80% by weight and at least one Portland cement clinker, or a cement produced therefrom, in an amount ranging from 20 to 95% by weight are mixed with each other, wherein the content of $C_5S_2\$$ in the binder amounts to at least 5% by weight and a content of $C_4(A_xF_{(1-x)})_3\$$ in the binder amounts to a maximum of 5% by weight.

21. The method according to claim 20, wherein the ternesite clinker and a Portland cement clinker are ground together or separately, with or without sulfate carriers in the form of alkali and/or alkaline earth sulfates to degrees of fineness (according to Blaine) ranging from 2000 to 10000 cm²/g.

22. The method according to claim 21, wherein pozzolans, latent hydraulic materials, or combinations thereof are ground together with the ternesite clinker and/or the Portland cement clinker.

23. The method according to claim 20, wherein the ternesite cement has a grain size distribution with $d_{50}$ less than 20 μm and $d_{90}$ less than 100 μm.

24. A method of producing concrete, mortar, or plaster, comprising:
  providing a binder containing Portland cement in an amount ranging from 20 to 95% by weight and a ternesite cement in an amount ranging from 5 to 80% by weight, the contents adding up to 100%, wherein the ternesite cement contains 20 to 100% by weight of a clinker phase comprising $C_5S_2\$$ and remaining clinker phases comprising $(\alpha; \beta)$ $C_2S$, $C_4(A_xF_{(1-x)})_3\$$, where x is from 0.1 to 1.0, $C_2(A_yF_{(1-y)})$, where y is from 0.2 to 0.8, reactive aluminates, periclase (M) and secondary phases, which are present in the following contents:

| | |
|---|---|
| $(\alpha, \beta)$ $C_2S$ | 0 to 80% by weight |
| $C_4(A_xF_{(1-x)})_3\$$ | 0 to <15% by weight |
| $C_2(A_yF_{(1-y)})$ | 0 to 30% by weight |
| reactive aluminates | 0 to 20% by weight |
| periclase (M) | 0 to 25% by weight |
| secondary phases | 0 to 30% by weight, | wherein contents of the clinker phases add up to 100%, or obtained according to claim 20,
  combining said binder with aggregate and water, and
  adjusting a water/binder value of 0.2 to 2.

25. A method for immobilization of harmful substances, or providing a sealing wall compound, comprising:
  providing a binder containing Portland cement in an amount ranging from 20 to 95% by weight and a ternesite cement in an amount ranging from 5 to 80% by weight, the contents adding up to 100%, wherein the ternesite cement contains 20 to 100% by weight of a clinker phase comprising $C_5S_2S$ and remaining clinker phases comprising $(\alpha; \beta)$ $C_2S$, $C_4(A_xF_{(1-x)})_3\$$, where x is from 0.1 to 1.0, $C_2(A_yF_{(1-y)})$, where y is from 0.2 to 0.8, reactive aluminates, periclase (M), and secondary phases, which are present in the following contents:

| | |
|---|---|
| $(\alpha, \beta)$ $C_2S$ | 0 to 80% by weight |
| $C_4(A_xF_{(1-x)})_3\$$ | 0 to <15% by weight |
| $C_2(A_yF_{(1-y)})$ | 0 to 30% by weight |
| reactive aluminates | 0 to 20% by weight |
| periclase (M) | 0 to 25% by weight |
| secondary phases | 0 to 30% by weight, | wherein contents of the clinker phases add up to 100%, or obtained according to claim 20, and
  adding zeolites and/or ion exchange resins.

26. The method according to claim 23, wherein the ternesite cement has a grain size distribution with $d_{50}$ less than 5 μm and $d_{90}$ less than 20 μm.

27. The method according to claim 21, wherein the ternesite clinker and the Portland cement clinker are ground together or separately, with or without sulfate carriers in the form of alkali and/or alkaline earth sulfates to degrees of fineness (according to Blaine) ranging from 3000 to 6000 cm²/g.

28. The method according to claim 21, wherein the ternesite clinker and the Portland cement clinker are ground together or separately, with or without sulfate carriers in the form of alkali and/or alkaline earth sulfates to degrees of fineness (according to Blaine) ranging from 4000 to 5000 cm²/g.

* * * * *